O. R. OPPERMAN.
MANUFACTURE OF TOOTHED BEVEL GEAR WHEELS OR CROWN WHEELS.
APPLICATION FILED DEC. 29, 1919.

1,352,021.

Patented Sept. 7, 1920.

Inventor
O. R. Opperman
By H. B. Willson & Co.
Attorneys

UNITED STATES PATENT OFFICE.

OTTO R. OPPERMAN, OF LONDON, ENGLAND.

MANUFACTURE OF TOOTHED BEVEL-GEAR WHEELS OR CROWN-WHEELS.

1,352,021.  Specification of Letters Patent.  Patented Sept. 7, 1920.

Application filed December 29, 1919. Serial No. 348,246.

*To all whom it may concern:*

Be it known that I, OTTO RUDOLF OPPERMAN, engineer, subject of the King of Great Britain and Ireland, whose post-office is 3 Albemarle street, London, E. C., 1, England, have invented certain new and useful Improvements in the Manufacture of Toothed Bevel-Gear Wheels or Crown-Wheels, of which the following is a specification.

This invention relates to the manufacture of toothed bevel gear wheels or crown wheels and more particularly to light gears such as are employed for example in driving speedometers and has for its object to simplify and reduce the cost of manufacture.

My invention is an improvement over those methods of manufacture hitherto applicable to comparatively thin material wherein teeth are cut in the periphery of a flat blank or ring and afterward bent out of the plane of the blank or ring.

According to this invention the wheels are first cut in the form of spur wheels and are then converted into bevel gears and crown bevel wheels by bending the teeth over at the required angle to form bevel teeth.

In carrying the invention into practical effect the bending over of the toothed part of the wheel is facilitated by cutting a groove around the wheel at the roots of the teeth and then at the groove bending the teeth over toward the grooved side at the required angle to the rim.

The light gear wheels are usually made of steel of uniform thickness and the teeth are readily pressed over to the required angle in a suitable press.

In the accompanying sheet of illustrative drawings.

Figure 1:
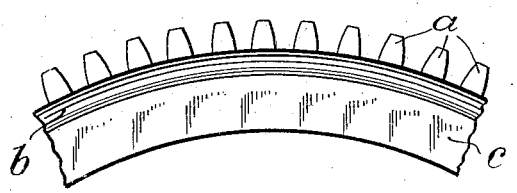
Figures 1 and 2 are side elevation and transverse section respectively of a portion of a gear wheel cut with spur teeth adapted to be bent to form a bevel gear.
Figure 2:
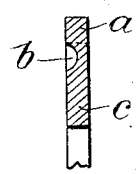
Figure 3:
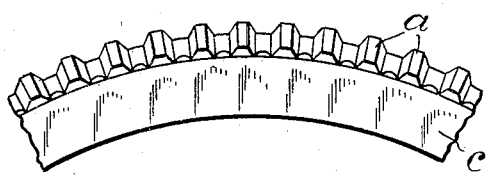
Figs. 3 and 4 are similar views to Figs. 1 and 2 showing the teeth bent at the required angle.
Figure 4:

In forming a gear as illustrated in Figs. 1 to 4 a steel ring or blank of uniform thickness is first cut with spur teeth *a* several rings being preferably cut at the same time. A groove *b* is then cut around the rim *c* of the spur wheel so formed adjacent to the roots of the teeth as shown in Figs. 1 and 2, the teeth being afterward pressed over bent or set at the desired angle to the plane of the wheel as shown in Figs. 3 and 4.

It will be seen that by the method described the manufacture is considerably simplified as several gears can be assembled on the same spindle and the teeth cut in the same operation.

I claim:

The improved method of manufacturing a toothed bevel gear or a crown wheel consisting in cutting the gear in the form of a spur-wheel, forming an annular groove in one side face of the wheel at the roots of the teeth to facilitate the bending over of the toothed portion and bending the teeth over at the required angle in the direction of the groove to form bevel or crown teeth.

In testimony whereof I have affixed my signature.

O. R. OPPERMAN.